US011043817B2

(12) United States Patent
Cassoli et al.

(10) Patent No.: US 11,043,817 B2
(45) Date of Patent: Jun. 22, 2021

(54) METHOD FOR FEEDING ELECTRICAL POWER INTO AN ELECTRICAL POWER SUPPLY NETWORK

(71) Applicant: Wobben Properties GmbH, Aurich (DE)

(72) Inventors: Jair Cassoli, Aurich (DE); Truong Duc Trung, Aurich (DE); Roberto Rosso, Aurich (DE); Sönke Engelken, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/494,694

(22) PCT Filed: Mar. 22, 2018

(86) PCT No.: PCT/EP2018/057236
§ 371 (c)(1),
(2) Date: Sep. 16, 2019

(87) PCT Pub. No.: WO2018/172441
PCT Pub. Date: Sep. 27, 2018

(65) Prior Publication Data
US 2020/0091728 A1 Mar. 19, 2020

(30) Foreign Application Priority Data
Mar. 22, 2017 (DE) .................... 10 2017 106 213.0

(51) Int. Cl.
*H02J 3/38* (2006.01)
*F03D 9/25* (2016.01)
*H02J 3/18* (2006.01)

(52) U.S. Cl.
CPC .............. *H02J 3/386* (2013.01); *F03D 9/255* (2017.02); *H02J 3/18* (2013.01); *H02J 2203/20* (2020.01)

(58) Field of Classification Search
CPC .......... H02J 3/386; H02J 3/18; H02J 2203/20; F03D 9/255
See application file for complete search history.

(56) References Cited

U.S. PATENT DOCUMENTS 8,510,090 B2  8/2013  Hesse et al.
9,270,194 B2  2/2016  Brogan et al.
(Continued)

FOREIGN PATENT DOCUMENTS

CN  103560524 B  1/2017
DE  102006047792 A1  4/2008
(Continued)

*Primary Examiner* — Sean Gugger
(74) *Attorney, Agent, or Firm* — Seed IP Law Group LLP

(57) ABSTRACT

A method for feeding electrical power into a three phase electrical power supply network at a network connection point, in particular by means of a wind power installation, using an inverter, comprising the following steps: detecting an electrical network voltage, in particular at the network connection point, determining a virtual generator voltage using a machine model that emulates a behavior of a synchronous machine, preparing the detected network voltage for comparison with the virtual genera-tor voltage, predefining a setpoint current as predefinition for an infeed current as a function of the virtual generator voltage and as a function of the network voltage prepared for comparison, and generating the infeed current depending on the setpoint current and feeding the generated infeed current at the network connection point into the electrical power supply network, wherein preparing the detected network voltage for comparison with the virtual generator voltage comprises transforming the detected network voltage into a space vector representation.

18 Claims, 6 Drawing Sheets

(56) References Cited

U.S. PATENT DOCUMENTS

| | | | |
|---|---|---|---|
| 9,300,142 B2 | 3/2016 | Tarnowski | |
| 9,920,746 B2 | 3/2018 | Diedrichs et al. | |
| 2010/0256970 A1* | 10/2010 | Heese | H02P 21/16 703/18 |
| 2012/0292904 A1* | 11/2012 | Tarnowski | H02J 3/386 290/44 |
| 2014/0225592 A1* | 8/2014 | Hesse | H02J 3/38 324/76.39 |
| 2014/0307488 A1* | 10/2014 | Brogan | H02J 3/382 363/35 |
| 2015/0357820 A1 | 12/2015 | Sugimoto et al. | |
| 2016/0006338 A1 | 1/2016 | Sakimoto et al. | |
| 2020/0099315 A1* | 3/2020 | Lee | H02M 7/53871 |
| 2020/0136540 A1* | 4/2020 | Brombach | H02J 3/08 |

FOREIGN PATENT DOCUMENTS

| | | |
|---|---|---|
| EP | 2793392 A1 | 10/2014 |
| JP | H10201242 A | 7/1998 |
| JP | 2010-541516 A | 12/2010 |
| JP | 2014168351 A | 9/2014 |
| JP | 2015-100234 A | 5/2015 |
| JP | 2015527857 A | 9/2015 |
| RU | 2221165 C2 | 1/2004 |
| WO | 2000074198 A1 | 12/2000 |
| WO | 2011/092193 A2 | 8/2011 |

\* cited by examiner

METHOD FOR FEEDING ELECTRICAL POWER INTO AN ELECTRICAL POWER SUPPLY NETWORK

BACKGROUND

Technical Field

The present invention relates to a method for feeding electrical power into an electrical power supply network. The present invention additionally relates to an apparatus, in particular a wind power installation for feeding electrical power into an electrical power supply network.

Description of the Related Art

It is known to use wind power installations for feeding into a three-phase electrical power supply network. It is also known that in this case the wind power installation can also perform network support tasks besides purely feeding in power. In particular, in order to support the electrical power supply network as a function of network states such as the network voltage or the network frequency, the infeed can be adapted for support purposes.

In this case, when evaluating or taking account of such network states, it is often assumed that large power plants having directly coupled synchronous generators determine the behavior of the network. The wind power installations, or other decentralized infeed apparatuses, take a corresponding behavior as a basis and react accordingly. In particular, it should be taken into consideration that systems that use converters to carry out infeed, in particular wind power installations that use a full converter or full converter concept to carry out infeed, may react to changes in network states with a very high dynamic range. Their dynamic range is substantially freely predefinable. In particular, they have hardly any physically dictated dynamic range, such as, e.g., a certain inertia behavior, unlike the case with directly coupled synchronous generators.

With increasing dominance of decentralized infeed apparatuses controlled wholly or partly by converters, such a physical dynamic range, like the dynamic range of directly coupled synchronous generators, is thus losing influence and dominance in the electrical power supply network. In particular, a network-stabilizing or at least steadying inertia of directly coupled synchronous generators may thereby be repressed and would have to be taken into account in some other way. One variant is to emulate a synchronous generator or the behavior of a synchronous generator by means of converter-controlled infeed apparatuses. For this purpose, a physical model of a synchronous generator can be stored in the controller of a converter for feeding in the electrical power and the converter can be controlled such that it behaves substantially like a synchronous generator.

However, that can firstly have the disadvantage that such synchronous generator models are complex and, therefore, may sometimes be difficult to handle during programming and parameterization. Moreover, an excessively complicated emulation may lead to excessively slow control or expensive control hardware may be necessary in order to be able to ensure sufficiently rapid control. Undesired signal delays may also occur as a result of filterings.

An additional factor is that an emulation of a synchronous generator may also have the consequence that not just the desired effects such as the abovementioned stabilization or steadying the high moment of inertia are achieved, rather that other behaviors of the synchronous generator also occur, which are possibly undesired. Besides a potential risk of loss of synchronism of a synchronous generator, it may also be mentioned that non-optimum, in particular non-optimally sinusoidal, currents may also be established in this case. Said currents may also be the result of an inadequacy of a synchronous generator model used.

The increasing foothold gained by converter-controlled infeed apparatuses in some electrical networks may also have the consequence that such infeed apparatuses will in the future have to undertake tasks in the area of a black start or at least network recovery.

BRIEF SUMMARY

Provided is a method for the infeed of electrical power by means of a converter-controlled generator as well as to an electrical power supply network having a small proportion of conventional large power plants having a directly coupled synchronous generator. In particular, an infeed with the highest possible quality and/or the best possible control stability is intended to be proposed for such a network or else an island network. At the very least, an alternative solution to previously known solutions is intended to be proposed.

Provided is a method related to feeding electrical power into a three-phase electrical power supply network at a network connection point by means of a wind power installation and using an inverter or converter in the process. In principle, consideration is also given to using some other decentralized generator, as long as an inverter or a converter is used in the process. Any descriptions and explanations concerning an inverter are also analogously applicable here to converters, and vice versa.

To that end, it is firstly proposed to detect an electrical network voltage at the network connection point. Detecting the electrical network voltage at the network connection point is advantageous particularly because infeed is also intended to be effected there and the electrical network voltage should therefore be taken into account there. In principle, however, consideration is also given to carrying out the measurement elsewhere in the electrical power supply network or elsewhere upstream of the network connection point, that is to say between the infeeding wind power installation and the network connection point, if a correspondingly representative voltage can be detected there.

A virtual generator voltage is then determined using a machine model. The machine model emulates a behavior of a synchronous machine. The virtual generator voltage determined in this way is thus a voltage which corresponds to the voltage of a generator whose behavior is emulated by the machine model.

Furthermore, the detected network voltage is prepared for comparison with the virtual generator voltage. That means, in particular, that the determined virtual generator voltage, which initially is substantially a computational variable, can be compared with the detected network voltage that was actually measured.

Moreover, a setpoint current is predefined as predefinition for an infeed current as a function of the virtual generator voltage and as a function of the network voltage prepared for comparison. That may mean, in particular, that a deviation between these two voltages leads to a corresponding setpoint current, e.g., such that a higher voltage deviation leads to a greater setpoint current.

In accordance with the setpoint current predefined in this way, an infeed current is then generated and fed at the network connection point into the electrical power supply network. A comparison between virtual generator voltage and measured voltage at the network connection point thus leads to a setpoint current dependent thereon and thus also to a correspondingly set infeed current.

It is then proposed that preparing the detected network voltage for comparison with the virtual generator voltage comprises transforming the detected network voltage into a space vector representation. The detected network voltage, namely of the three-phase electrical power supply network, and thus in particular also the three-phase network voltage detected in this way, is thus transformed into a space vector representation. It has been recognized that preparing the measured network voltage in a space vector representation promotes in particular the taking into account of the sinusoidal fundamental signal. The virtual generator voltage is likewise the result of a calculation and should therefore likewise be assumed to be sinusoidal with low distortion and little noise.

Preferably, transforming the detected network voltage into a space vector representation is a d/q transformation, which can also be referred to as qd transformation or as Park transformation. Such a d/q transformation presupposes a three-phase system and transforms this into a two-axis, rotating coordinate system having the axes d and q or the values d and q. Ideally, the values d and q are constant because they concomitantly rotate with the coordinate system. The transformation presupposes in principle a system having sinusoidal variables, even if, as a result of changes over time, variables deviating from sinusoidal variables can also be taken into account. Nevertheless, such sinusoidal variables are taken as a basis and, as a result, the d/q transformation or the calculation in the space vector representation may also have a nonlinear filter function which can to a certain straight line filter out disturbances deviating from a sinusoidal signal or other deviations or can keep them out of the setpoint current ultimately to be generated.

Particularly for the comparison between detected network voltage and virtual generator voltage, it is advantageous to use such a sinusoidal voltage.

In accordance with one embodiment, it is proposed that the network voltage in the space vector representation into which it was transformed is filtered and is subsequently subjected to inverse transformation, such that the setpoint current is predefined as a function of the virtual generator voltage and as a function of the inverse-transformed network voltage. The filtering of the detected network voltage is thus effected in the space vector representation. This prevents distortion or delay of the sinusoidal fundamental signal. In particular, a filtered sinusoidal signal results after inverse transformation, for which signal a sinusoidal is also assumed on account of the underlying transformation specification or inverse transformation specification.

It has been recognized that in the space vector representation it is possible to realize a simple filtering, in particular a filtering with a PT1 element, which filtering leads to an advantageous filter effect in the inverse-transformed sinusoidal signal. In particular, a significantly more complex filter would have been necessary for a filtering in the time domain with the same filter result. However, such a more complex filter would be complicated to parametrize and not very robust. If, in the case of such a complex filter, the disturbance to be filtered out changes in its type, then it is possible for the quality of the filter to decrease or even for the effectiveness thereof to be questioned. By contrast, the proposed filtering in the space vector representation is robust and deliberately adapted substantially to the fundamental signal that is to be filtered being sinusoidal. In particular, it is important that the values d and q in the space vector representation are ideally constant. To put it simply, the filter can thus filter substantially to a constant value. A simple linear filter can be used despite a nonlinear input variable or an input variable having a nonlinear profile.

Consequently, a sinusoidal waveform of the detected network voltage that is as free of disturbance as possible, and as free of delay as possible is achieved and said voltage can then readily be compared with the virtual generator voltage, which is likewise sinusoidal. Predefining the setpoint current can thus be carried out with high quality as a function of this inverse-transformed network voltage and the virtual generator voltage.

Preferably, the machine model takes as a basis a virtual synchronous machine having a stator and a rotor, which are thus likewise virtual, even without that being mentioned. For determining the generator voltage, the machine model uses one, a plurality or all of the variables in the following list:
a virtual angle of rotation $\theta$ of the rotor,
a virtual rotational speed $\omega$ of the rotor,
a virtual excitation voltage,
a virtual stator current,
a virtual moment of inertia J of the rotor,
a virtual torque $T_e$ of the rotor, and
a virtual friction Dp of the rotor.

For the sake of simplicity, these and other virtual variables may also be referred to hereinafter without the addition "virtual" since, in so far as they relate to the virtual generator, they are themselves also virtual. By way of the virtual angle of rotation ($\theta$) of the rotor, that is to say of the virtual rotor, the position thereof is concomitantly recorded, which influences the phase angle of the generator voltage.

By taking account of the virtual rotational speed ($\omega$) of the rotor, the frequency of the generator voltage can be taken into account and influenced.

By means of the virtual excitation voltage, in particular the amplitude of the generator voltage can be influenced and taken into account.

By means of the virtual stator current, in particular a behavior of the virtual synchronous machine with regard to a connected impedance can also be taken into account.

By way of a virtual moment of inertia (J) of the rotor, in particular the dynamic range of the virtual synchronous machine is also able to be influenced.

By way of a virtual torque ($T_e$) of the rotor, the dynamic behavior of the virtual synchronous machine can likewise be taken into account and influenced.

A virtual friction of the rotor can be realized in particular as the gain of frequency-dependent power control. This power control is preferably part of the machine model and takes account of deviations between the rotational frequency of the machine model and a reference frequency. The reference frequency can be a measured network frequency or a predefined frequency. It is thereby possible to take account of a frequency-dependent behavior of the virtual synchronous machine in the machine model.

Preferably, the generated infeed current is used as virtual stator current. In particular, the relation of the virtual synchronous machine to the actual infeed is produced as a result. The infeed current that is generated and then actually fed in is also dependent on conditions of the interconnection of the inverter output or converter output, in particular on conditions in the electrical power supply network, and these influences can thus be taken into account by way of the infeed current, which then forms the virtual stator current, in the virtual synchronous machine, that is to say in the machine model.

Additionally or alternately, it is proposed that the virtual moment of inertia is settable. As a result, in particular, the dynamic range of the virtual synchronous machine can be influenced. Depending on the specific situation or requirement, a larger or smaller virtual moment of inertia can be chosen. In particular, for fast synchronization of the virtual synchronous machine or of the machine model with the electrical power supply network, if an infeed is not yet being effected, but rather first prepared, a small virtual moment of inertia may be expedient. Particularly when feeding into the electrical power supply network, a higher virtual moment of inertia may be expedient for the support and stabilization of the electrical power supply network. Particularly in the case where the electrical power supply network is an island network and must be stabilized by the inverter, or if the inverter in this case is intended even to operate as a network forming element, a particularly high moment of inertia is taken into consideration as a preferred setting. However, even in an electrical power supply network which is not an island network, different network situations can occur, to which it is possible to react using a correspondingly adapted virtual moment of inertia. Consideration is also given to the fact that the network operator of such an electrical power supply network makes stipulations in respect of the dynamic range of the infeed, to which it is possible to react using a corresponding set virtual moment of inertia.

Preferably, the virtual moment of inertia is set as a function of a network state or a network property. A network state is, e.g., an overfrequency or an underfrequency, or actually the present value of the frequency. The present network voltage is also a network state and this also includes an overvoltage or undervoltage, to mention a further example. By way of example, a network sensitivity can be taken into account as network property, which network sensitivity can be specified as the ratio of a voltage change at a network connection point considered in relation to a change in the fed-in power at the network connection point considered. In this respect, the network sensitivity is also a property of the electrical power supply network that is related to the network connection point. It may specify how sensitively the network reacts to changes. Particularly in the case of a high network sensitivity, it may be advantageous to choose a correspondingly high virtual moment of inertia for stabilization purposes.

In accordance with one configuration, it is proposed that a virtual network impedance is taken into account for predefining the setpoint current, which virtual network impedance is taken into account as an impedance between an output of the machine model or the virtual synchronous machine and the network connection point. To that end, it is proposed that the magnitude of the virtual impedance is variable. The virtual synchronous machine is thus interconnected with a virtual impedance, such that said virtual impedance in particular also influences a current as a function of the generator voltage.

Various properties of the electrical power supply network can be taken into account by way of the virtual impedance. The behavior of the virtual synchronous machine can thereby be altered in a simple manner in order thereby to take account of altered properties of the electrical power supply network. A dedicated taking into account may be dispensable as a result.

Preferably, the virtual impedance is selected depending on whether infeed is effected in a normal state of the electrical power supply network, or infeed is effected in a recovery mode after interruption or failure of the electrical power supply network, in which recovery mode the electrical power supply network must be run up to a normal operating point. For the network recovery mode, provision is made, in particular, for the virtual impedance to be chosen to be greater than in the normal state of the electrical power supply network, in order to be able to facilitate the run-up to the normal operating point. In particular, in the course of the run-up to the normal operating point, a generator voltage can gradually be increased and at the same time, the virtual impedance can be adapted such that a low current flows as long as in said network recovery mode a large amount of power is not yet intended to be fed in.

A network recovery or a black start can thus be realized in a simple manner. In particular, the requirement that, in the case of a black start, it is initially of primary importance to generate and maintain a voltage, while only little power is fed in, can be achieved as a result. At the same time, a normal mode is likewise able to be realized with the same arrangement. By adapting the virtual impedance, the infeed apparatus can be adapted to infeed in the normal mode.

In accordance with one embodiment, it is proposed that in the machine model
- a rotational speed difference between a virtual rotational speed and a reference rotational speed is formed,
- a filtered value of the virtual rotational speed or a predefined frequency is used as the reference rotational speed,
- the difference rotational speed is calculated by way of a difference rotational speed gain with respect to an auxiliary torque,
- the auxiliary torque acts on the virtual moment of inertia of the machine model by way of a summing point in order thereby to control the virtual rotational speed to the reference rotational speed, wherein preferably
- the difference rotational speed is set to zero for the purpose of synchronizing the machine model with the electrical power supply network.

By way of taking account of and feeding back said difference rotational speed, it is thus possible to carry out a correction of the virtual rotational speed to the reference rotational speed, wherein it is not absolutely necessary to achieve a steady-state accuracy with the deviation zero. In particular, this difference rotational speed feedback by way of the difference rotational speed gain can be referred to as so-called droop control. The latter takes account of a behavior of a synchronous machine that initially becomes slower in the event of a higher power being called up. As a result of such a higher power output, which in particular is also distinguished by higher output currents, that is to say here infeed currents, the torque of the synchronous generator increases and the virtual torque of the synchronous generator correspondingly increases. In this case, said virtual torque of the synchronous generator takes effect at the same summing point at which the auxiliary torque also takes effect or is added.

Preferably, the difference rotational speed gain is a positive factor and the auxiliary torque is subtracted at the summing point. If the rotation of the virtual synchronous machine slows down, that is to say the virtual rotational speed decreases, while the reference rotational speed remains constant or changes more slowly, then the difference rotational speed is negative and the auxiliary torque is also negative and subtracting this negative auxiliary torque at the summing point leads as a result to an increase in the total torque at the summing point by the absolute value of the auxiliary torque. For this exemplary case, the virtual synchronous machine is thus accelerated or counteracts an increased virtual generator torque.

For the purpose of synchronizing the machine model with the electrical power supply network, however, it is proposed to deactivate this droop control. That can be done by the difference rotational speed being set directly to 0. However, that can also be done indirectly by the difference rotational speed being formed as a difference between two identical rotational speeds, as a result of which the difference rotational speed is then also 0. To that end, the filter that filters the virtual rotational speed can be set to one.

In particular, consideration is given to the variant in which the reference rotational speed is the filtered virtual rotational speed. The filtered virtual rotational speed is then subtracted, therefore, from the virtual rotational speed. In the case of a filter function which has a total gain of 1 but has a dynamic range, this difference rotational speed thus gradually becomes 0 in the case of a steady-state rotational speed.

It is proposed at all events for the synchronization that the difference rotational speed, and thus the auxiliary torque, is set to 0 and the droop control be deactivated, as a result of which such rotational speed control is suppressed. Particularly if no or no appreciable currents flow in the event of the synchronization, that is to say that, in particular, the setpoint power is also 0, the virtual synchronous machine is thus substantially in an open-circuit state and in this case this state is not actually disturbed by said droop control. Consequently, in a kind of open-circuit situation, the virtual synchronous machine can be brought to or held in a state in which it runs synchronously with the electrical power supply network into which infeed is ultimately intended to be effected. If this case is attained, and if the voltage and frequency of the electrical power supply network also do not change, the virtual synchronous machine is basically in a stable open-circuit-like operating state.

Preferably, it is proposed that
for the purpose of synchronizing the machine model with the electrical power supply network,
a setpoint power has the value zero,
a calculation model is used for calculating
internal virtual generator voltages and/or
the virtual torque $T_e$, wherein
the calculation model uses for calculating one, a plurality or all of the variables in the list comprising
the virtual angle of rotation $\theta$ of the rotor,
the virtual rotational speed $\omega$ of the rotor,
the virtual excitation voltage, and
the infeed current or the setpoint current, wherein
in particular no frequency of the electrical power supply network is detected.

Consequently, in this case, for the purpose of synchronizing the machine model with the electrical power supply network, firstly the setpoint power is set to the value 0. The setpoint power acts on the virtual moment of inertia as drive torque in the machine model by way of a corresponding conversion factor. By virtue of the fact that this power is set to 0, the drive torque of the virtual machine is thus likewise set to 0. Therefore, the virtual synchronous machine then obtains no drive. Internal virtual generator voltages and the virtual torque are then calculated using a calculation model. In principle, consideration is also given to calculating only one of the variables, but it is advantageous to calculate all of these variables mentioned. In this case, the calculation model preferably uses the machine equations of a synchronous machine which are parameterized in accordance with the virtual synchronous machine assumed.

For this purpose, the calculation model obtains in particular the virtual angle of rotation of the rotor, the virtual rotational speed of the rotor, the virtual excitation voltage and the infeed current as input variable. These are required in the machine equations in order to calculate the variables mentioned. In principle, however, simplifying calculations by means of a simplified model are theoretically suitable as well. The virtual rotational speed can also be calculated from the virtual angle of rotation, and so both variables would not need to be input into the calculation model.

As infeed current, it is possible to use an actually generated current that was generated in accordance with the predefined setpoint current. Moreover, here and also for the rest of the description, a setpoint current and also the infeed current and correspondingly resulting currents should be understood to mean in each case a three-phase current. The infeed current, or the setpoint current, in this respect forms in each case three individual currents, namely each respectively of one phase.

In any case, a low infeed current can also be generated in the course of the synchronization and can flow into relatively small loads still present upstream of the network connection point. Particularly in the case of a wind farm having a plurality of wind power installations, small loads can be used in the corresponding farm network. That may be, e.g., line inductances or the transformer of the wind power installation. An inductor is also appropriate. Moreover, the virtual impedance can be set to the corresponding values or behaviors of these small loads.

Alternatively, if there is not yet any current flowing at all, the predefined setpoint current can enter into the calculation model as actual current.

In accordance with one embodiment, it is proposed that
the virtual excitation voltage is determined at least as a function of
a predefined reactive power and optionally
a predefined electrical network voltage at the network connection point.

By way of a predefined reactive power, which is compared in particular with a measured reactive power, such that in particular such a reactive power deviation is thus used, the virtual excitation voltage can be determined. In particular, this reactive power difference or reactive power deviation is provided by way of a reactive power gain and integrated to form the virtual excitation voltage. The reactive power gain is thus a gain factor of the integrator for the reactive power control.

Optionally, a predefined electrical network voltage at the network connection point is determined, which voltage concomitantly influences the virtual excitation voltage. For this purpose, in particular, a difference between this detected network voltage and a predefined voltage is formed. This voltage difference can form a reactive power value by way of a voltage gain and can then likewise influence the virtual excitation voltage like the described difference between predefined reactive power and measured reactive power. Specifically, for this purpose, the sum of these reactive powers can be integrated jointly to form the virtual excitation voltage, wherein the integrator has the described reactive power gain as integration constant.

It is preferably proposed that electrical variables of the machine model are calculated in space vector representation, in particular in accordance with a d/q transformation. This concerns, in particular, a three-phase stator current and a three-phase stator voltage. The virtual synchronous machine can thereby be calculated in an efficient manner. In particular, it is thereby readily possible to calculate and in particular also ensure a symmetrical three-phase system.

In accordance with one configuration, it is proposed that the infeed current is generated by means of a tolerance band method. In particular, it is thus controlled in accordance with the tolerance band method. In this case, the tolerance band method operates in principle such that a tolerance band is placed around the desired signal waveform of the current to be generated, that is to say in particular around the sinusoidal signal waveform of the current to be generated. The current respectively generated is measured and then controlled depending on the measurement value by way of corresponding switch positions, namely such that the current is reduced if it reaches an upper tolerance band limit, and such that the current is increased if it reaches a lower tolerance band limit. The use of a tolerance band method for feeding in or moreover generating an electric sinusoidal current is known in principle. Here, however, a method is proposed which can achieve voltage shaping despite the use of the tolerance band method. That is possible using the virtual impedance, in particular, by way of which, despite a current being predefined, ultimately an output voltage can be not only attained but also predefined in a targeted manner. In particular, this voltage can be increased in a targeted and guided manner in the case of network recovery or even a black start.

In particular, island network operation is also possible and it is proposed, in particular, that in island operation, if the inverter predefines the network frequency, the virtual rotational speed w is dependent on a predefined network frequency, in particular such that a or the auxiliary torque acting in the machine model is controlled as a function of a difference between virtual rotational speed and predefined network frequency, and/or the virtual excitation voltage
is dependent on a predefined voltage of the electrical power supply network and a detected voltage of the electrical power supply network, in particular such that an auxiliary reactive power value is controlled as a function of a difference between the predefined voltage and the detected voltage, the virtual excitation voltage being dependent on said auxiliary reactive power value.

The proposed method, at least in accordance with this embodiment, is thus suitable in particular for island operation or island network operation. Island network operation is considered here to be such operation which involves a closed electrical power supply network in which the wind power installation, or some other inverter- or converter-controlled infeed apparatus, has a dominance such that it substantially governs the network, in particular with regard to frequency and voltage. For this purpose, it is proposed that the virtual rotational speed is dependent on a predefined network frequency. Here, therefore, the network frequency is predefined, in particular as a fixed reference frequency. An auxiliary torque can be determined as a function of a difference between the virtual rotational speed, that is to say a rotational speed in the machine model, and the predefined network frequency, said auxiliary torque in this respect thereby being controlled by closed-loop or open-loop control or being set. Said auxiliary torque counteracts the virtual electrical torque in the model. The difference between the auxiliary torque and the virtual electrical torque, if appropriate after taking into account further torques, acts on the virtual rotational speed resulting therefrom by means of integration with a corresponding integration time constant.

The virtual rotational speed can then in turn be an input variable for the calculation model and thereby predefine the frequency of the generator voltage and thus ultimately also the frequency of the reference currents. By means of this method, therefore, in particular a fixed frequency can be implemented by means of the use of the virtual synchronous machine such that the electrical island network is thereby governed with regard to frequency.

The control of the auxiliary torque preferably uses a PI controller in order to correct the virtual rotational speed with steady-state accuracy to the predefined network frequency or a corresponding rotational speed.

Additionally or alternatively, it is proposed here that the virtual excitation voltage is dependent on a predefined voltage of the electrical power supply network and a detected voltage of the electrical power supply network. This is proposed in particular such that an auxiliary reactive power value is ascertained as a function of a difference between the predefined voltage and the detected voltage. If appropriate, a detected reactive power value is subtracted therefrom. This reactive power value thus obtained can be integrated to form the virtual excitation voltage, in particular by way of a reactive power gain, as has already been explained.

By taking account of the voltage, a voltage control can be effected, which can also be referred to as droop voltage control. This voltage control can preferably be activated or deactivated. By virtue of the optional use of the predefined voltage and the detected voltage being taken into account, that is to say being activated, said voltage control is thus activated. The virtual synchronous machine is thus controlled such that it can react to voltage changes in the electrical power supply network, in particular at the network connection point, with a voltage control. It can thus act in a voltage-stabilizing or voltage-compensating manner as a result. This variant is proposed for island network operation, in particular, because a voltage control and thus voltage management can be achieved as a result. This control then manifests its effect by way of the electrical excitation voltage. As a result, in an island network the method can predefine or manage not only the frequency but also the voltage, that is to say the voltage amplitude.

For island network operation, it is thus proposed, in particular, that the auxiliary torque is controlled by way of a PI controller and the virtual rotational speed results in particular from an integration of a difference torque, as difference between the auxiliary torque and the virtual electrical torque, by way of an integration time constant, and/or the auxiliary reactive power value is controlled by way of a PI controller, and the virtual excitation voltage results in particular from an integration of a difference reactive power, as difference between the auxiliary reactive power and a detected reactive power, by way of an integration time constant.

A torque resulting from a difference between the controlled auxiliary torque and the virtual torque thus acts on the machine model. This is integrated in the machine model, namely by way of the inverse virtual moment of inertia as integration time constant, and thus determines the virtual rotational speed. In so far as no further torque is added, this integration yields the virtual rotational speed. By this means, the rotational speed of the virtual synchronous machine is thus controlled by open-loop or closed-loop control.

By way of the reactive power, the output voltage is controlled by closed-loop or open-loop control. For this purpose, the voltage deviation with respect to a reference value or setpoint value as control deviation is converted into a reactive power value by way of a PI control and thus, by way of the virtual excitation voltage, the voltage is controlled by means of the virtual synchronous machine.

A wind power installation is also proposed according to the invention, which wind power installation is prepared for feeding electrical power into a three-phase electrical power supply network at a network connection point. For this purpose, said wind power installation comprises at least one inverter for generating an infeed current. Thus, the inverter then generates such an infeed current, e.g., by way of a tolerance band method. Moreover, provision is made of a detection means for detecting an electrical network voltage, and said electrical network voltage is detected in particular at the network connection point. The detection means can accordingly be embodied as a measuring instrument or measuring sensor and measure the voltage at the network connection point, such as by a voltmeter. However, the actual sensor can also be present as a separate element that does not form part of the wind power installation. The wind power installation then has an interface via which can receive the detected network voltage and this interface can then serve as detection means for detecting the electrical network voltage.

Moreover, provision is made of a control device (controller) for controlling the infeed. Said control device drives the inverter, in particular. For this purpose, provision can be made of a specific microprocessor in the inverter, which provides switching acts in the inverter and which is driven by the control device, in particular obtains setpoint values for the infeed current. However, the control device can also act directly on the inverter.

At all events it is proposed that the control device is prepared to carry out a method which determines a virtual generator voltage using a machine model, wherein the machine model emulates a behavior of a synchronous machine. Consequently, at least said machine model is implemented in the control device. For this purpose, the control device can comprise a corresponding microprocessor or other computer devices.

Moreover, the implemented method comprises the step of comparing the detected network voltage for comparison with the virtual generator voltage. In particular, the network voltage is filtered for this purpose such that as far as possible only a fundamental of the network voltage is compared with the virtual generator voltage. That is based on the concept that the virtual generator voltage is generated in the control device and in particular with the aid of the machine model and therefore has no or no appreciable measurement disturbances. Since the comparison does not involve identifying differences in the measurement disturbances, the detected network voltage should be prepared as far as possible such that it has no measurement disturbances, or at least the fewest possible or weakest possible measurement disturbances.

Furthermore, the implemented method comprises the step of predefining a setpoint current as predefinition for the infeed current as a function of the virtual generator voltage and as a function of the network voltage prepared for comparison. Consequently, the setpoint current is thus predefined as a function of the virtual generator voltage and as a function of the network voltage.

Furthermore, the inverter is prepared to generate the infeed current depending on the setpoint current and to feed the generated infeed current at the network connection point into the electrical power supply network. In particular, a corresponding interconnection at the output of the inverter is also advantageous for this purpose. This may include a corresponding inductor. Moreover, for this purpose, the inverter is connected to the network connection point, if appropriate, via at least one further transformer.

It is additionally proposed that preparing the detected network voltage for comparison with the virtual generator voltage comprises transforming the detected network voltage into a space vector representation. The control device is thus also prepared to provide such a transformation. For this purpose, corresponding transformation algorithms can be implemented in the control device. Moreover, the control device is equipped with corresponding computational capacity, that is to say in particular with a corresponding microprocessor or other computer device.

Preferably, such a wind power installation, in particular the control device, is prepared to carry out a method for feeding electrical power into an electrical power supply network in accordance with at least one embodiment described above. For this purpose, it is proposed to implement the steps explained in each case in the control unit.

A wind farm is also proposed according to the invention, which wind farm comprises a plurality of wind power installations, wherein the wind power installations are embodied in accordance with at least one embodiment described above. Additionally, or alternatively, it is proposed that the wind farm comprises a farm infeed device, which is connected to a network connection point and is prepared to carry out a method in accordance with an embodiment described above. In particular, a farm inverter is proposed for this purpose. Such a farm infeed device or the farm inverter, particularly in the case of a wind farm having a DC network, can feed power from the wind power installations of the wind farm in the entirety thereof into the electrical power supply network. If appropriate, that can also be done with a high voltage. In particular, a central farm inverter is proposed here for this infeed. Such a central farm inverter can also operate on the basis of the emulated synchronous machine proposed and apply the proposed methods, or one thereof.

BRIEF DESCRIPTION OF THE SEVERAL VIEWS OF THE DRAWINGS

The invention is explained in greater detail by way of example below with reference to the accompanying figures.

DETAILED DESCRIPTION

Figure 1:
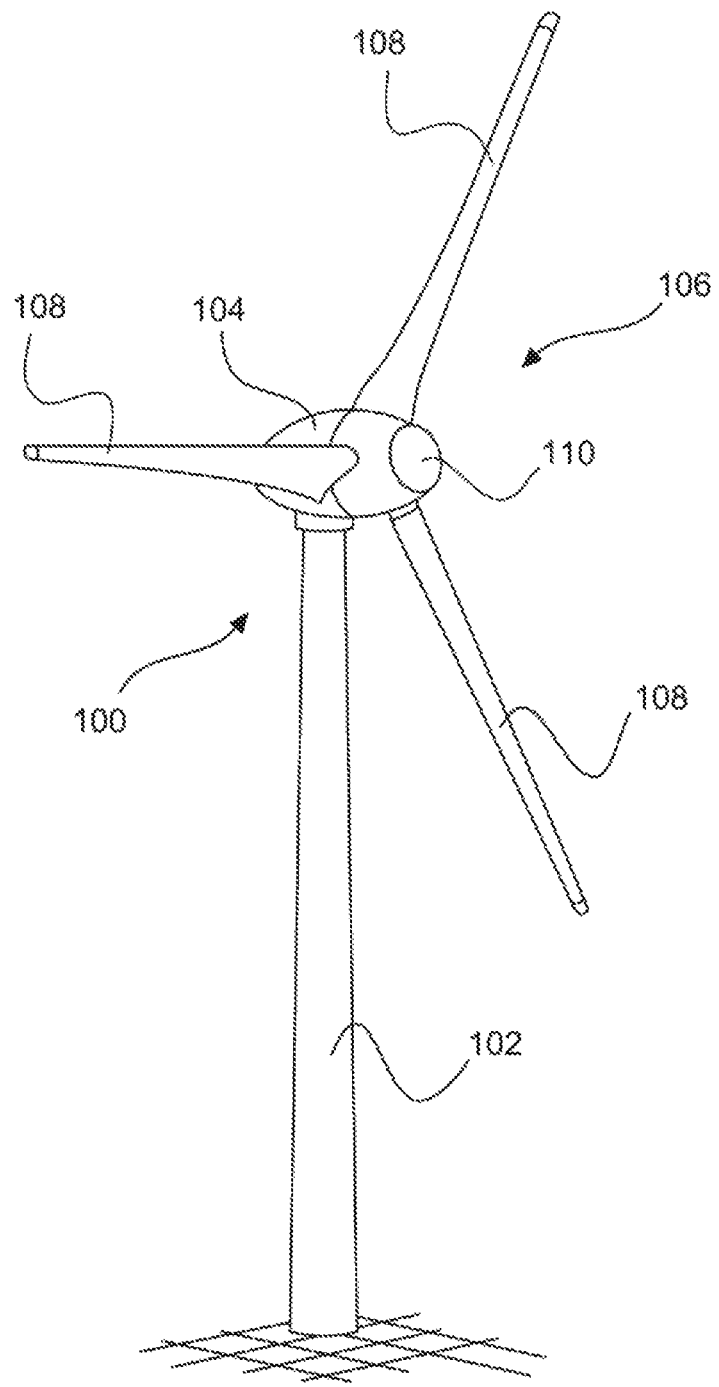
FIG. 1 shows a wind power installation in a perspective illustration.

FIG. 1 shows a wind power installation 100 comprising a tower 102 and a nacelle 104. A rotor 106 comprising three rotor blades 108 and a spinner 110 is arranged on the nacelle 104. The rotor 106 is caused to effect a rotational movement by the wind during operation and thereby drives a generator in the nacelle 104.

Figure 2:
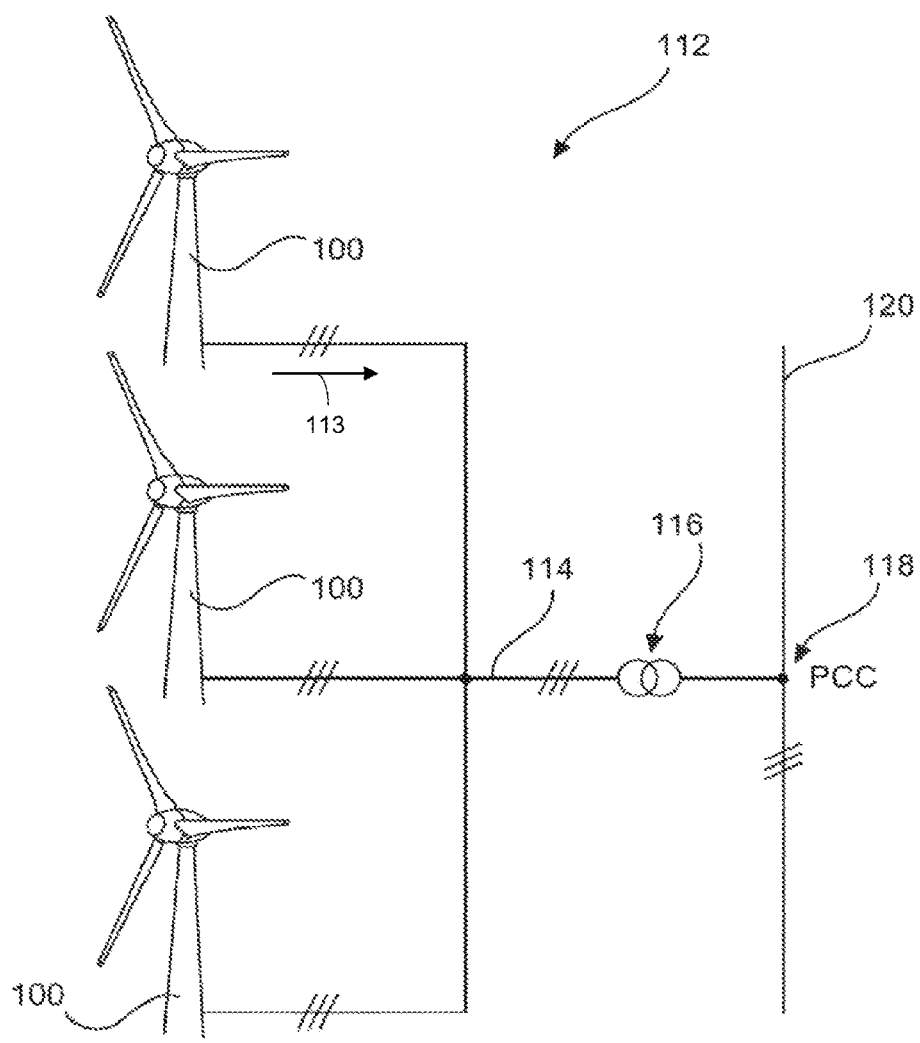
FIG. 2 shows a wind farm in a schematic illustration.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current 113, via an electrical farm network 114. In this case, the respectively generated currents or powers of the individual wind power installations 100 are added and a transformer 116 is usually provided, which steps up the voltage in the farm in order then to feed it into the power supply network 120 at the infeed point 118, which is also generally referred to as PCC. FIG. 2 is merely a simplified illustration of a wind farm 112, which for example does not show a controller, even though a controller is present, of course. Moreover, by way of example, the farm network 114 can be configured differently, with for example a transformer also being present at the output of each wind power installation 100, to mention just one different exemplary embodiment.

The proposed method is a current control method of a full converter during island and network operation on the basis of the equation of motion of a synchronous machine. The invention thus relates to a current control method of a full converter, the core control of which is based on the equation of motion of a synchronous machine. This control makes it possible to emulate inter alia the moment of inertia of a synchronous machine in the case of network state changes, in particular changes in the network frequency and the network voltage, in a manner as freely settable as possible. This property is also dependent on an energy stored in the DC link circuit of the full converter. Consideration is also given to an energy fed into the link circuit by way of a link circuit voltage control by means of a primary energy source. Said energy can then likewise be available in the DC link circuit.

The method is also explained in greater detail below by way of example on the basis of a number of examples.

Figure 3:
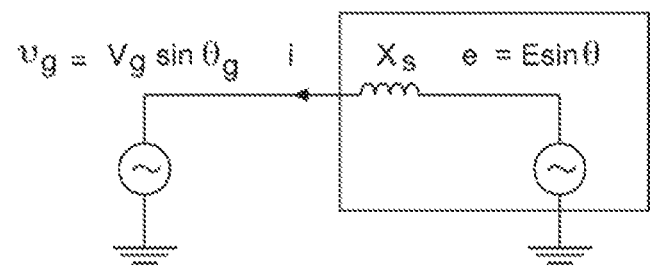
FIG. 3 shows an equivalent circuit diagram for power transfer between two AC voltage sources.

In an AC system, the transferred active and reactive powers between two nodes having the voltages V and E are determined by means of the following equations:

$$P = \frac{V * E * \sin\delta}{X} \quad (1)$$

$$Q = \frac{E^2 - E * V * \cos\delta}{X} \quad (2)$$

wherein X is the line reactance between the two nodes and δ is the phase shift between the two voltages. That is illustrated in the equivalent circuit diagram in FIG. 3.

Assuming that E is the output voltage of a full converter connected to the voltage V at the network, equations (1) and (2) make it clear that the transferred active and reactive powers can be influenced by the amplitudes and phase angle of the output voltage of the converter.

The control consists of an outer and inner control loop. In the outer control loop, the amplitude and the angle of the rotor voltage of a virtual synchronous machine are varied dynamically such that the active and reactive powers of a full converter that are fed into the network are corrected to predefined setpoint values. The active power control is based on the equation of motion of a synchronous machine, while the reactive power or voltage control is based on a P controller or PI controller.

$$\frac{d\omega_r}{dt} = \frac{T_m - T_e - K_D \Delta \omega_r}{J} \quad (3)$$

Equation (3) describes the equation of motion of a synchronous machine, wherein $T_m$ and $T_e$ respectively represent the mechanical and electromagnetic torque, $\omega_r$ represents the rotor speed, $K_D$ represents the damping factor, and J represents the inertia of the synchronous machine.

Figure 4:
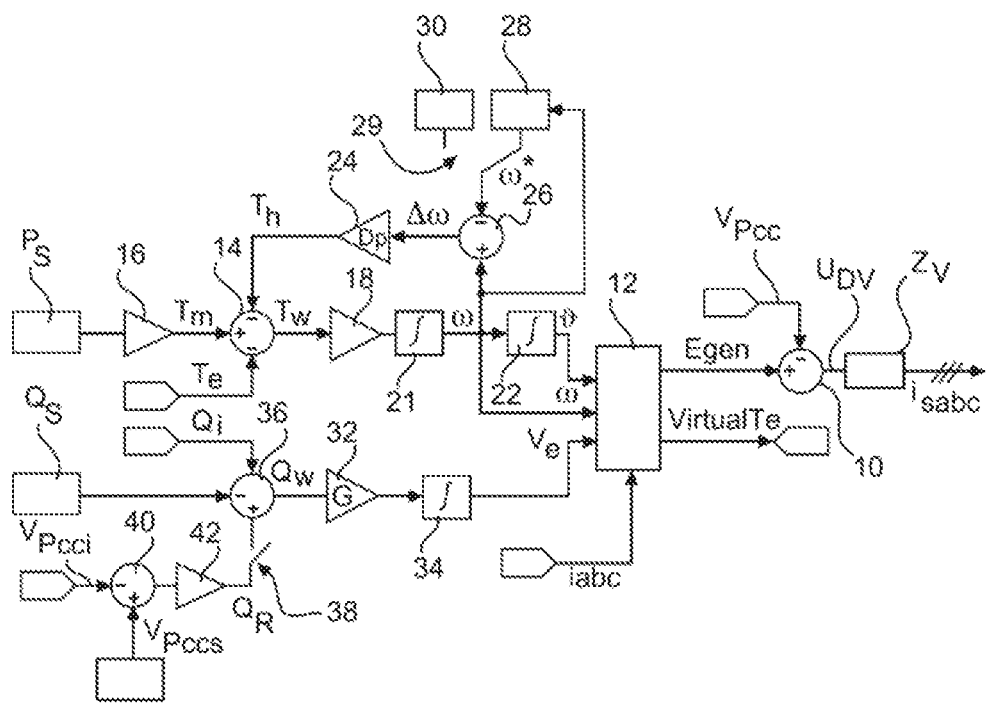
FIG. 4 shows a schematic structure diagram of an infeed method in accordance with one embodiment for network operation.

$T_m$ is determined by means of an active power setpoint value, as will also be explained with respect to FIG. 4, while $K_d$ and J are settable parameters. The variable $K_D$ can also be referred to as gain $D_P$.

The electrical variables of the virtual synchronous machine are transformed into d/q components with respect to the rotor coordinate system and are used for the calculation of Te. The d/q transformation may also be referred to as qd transformation or transformation into qd coordinates and, for further explanations regarding the transformation, reference is made to the literature reference [Lit1] cited below. The angle θ resulting from the solution of (3) and integration of $\omega_r$ is used for the transformation.

The abc/qd transformation matrices are defined as follows:

$$[T_1] = \frac{2}{3} \begin{bmatrix} \cos\theta & \cos\left(\theta - \frac{2\pi}{3}\right) & \cos\left(\theta + \frac{2\pi}{3}\right) \\ \sin\theta & \sin\left(\theta - \frac{2\pi}{3}\right) & \sin\left(\theta + \frac{2\pi}{3}\right) \\ \frac{1}{2} & \frac{1}{2} & \frac{1}{2} \end{bmatrix} \quad (4)$$

$$[T_1]^{-1} = \begin{bmatrix} \cos\theta & \sin\theta & \frac{1}{2} \\ \cos\left(\theta - \frac{2\pi}{3}\right) & \sin\left(\theta - \frac{2\pi}{3}\right) & \frac{1}{2} \\ \cos\left(\theta + \frac{2\pi}{3}\right) & \sin\left(\theta + \frac{2\pi}{3}\right) & \frac{1}{2} \end{bmatrix} \quad (5)$$

In the case of a cylindrical-rotor machine, $T_e$ is calculated as follows:

$$T_e = \frac{3}{2} p L_m i_f i_q \quad (6)$$

In this case, p represents the number of pole pairs, $L_m$ represents the mutual inductance, $i_f$ represents the excitation current, and $i_q$ represents the q component of the stator current, wherein the portion $L_m i_f$ results from the reactive power and voltage control.

The amplitude of the virtual rotor voltage in qd components is calculated from:

$$E_q = \omega_r L_m i_f \quad (7)$$

$$E_d = 0 \quad (8)$$

θ and (5) are used to effect inverse transformation of (7) and (8) into abc. It should be noted that in this case, the voltage angle θ is not obtained from the network voltage separately by means of a method such as a phase locked loop, for example, but rather results from the solution of the above-described system of equations, in particular equation (3) of motion. This is a crucial advantage of the method class of control methods based on synchronous machines, since delays such as are customary with the order of magnitude of tens of ms in the case of phase locked loops and similar methods are avoided in this case.

The inner control loop consists of a current hysteresis controller, which can also be referred to as tolerance band method, the setpoint values of which result from the instantaneous values of the virtual rotor voltages $e_{abc}$, measured voltages at the converter terminals $v_{abc}$, and a virtual stator impedance $Z_s$.

The virtual stator impedance can be set such that the control stability is ensured, and consists of the following equation:

$$Z_s = R_s + sL_s \quad (9)$$

wherein $R_s$ and $L_s$ represent the stator resistance and the stator inductance of the virtual synchronous machine.

Consequently, the current setpoint values are calculated from:

$$i_{sabc} = \frac{e_{abc} - v_{abc}}{Z_s} \quad (10)$$

The measured terminal voltages of the converter are not necessarily sinusoidal and, depending on the mode of operation or network state, may contain many harmonics, which may have a negative effect on the current setpoint values in accordance with equation (10) and the entire control. This will be the case for example in open-circuit operation, i.e., when a voltage is impressed without a load, or in the event of highly nonlinear loads. In principle, the always symmetrical rotor voltage of the system of equations for a synchronous generator counteracts this asymmetry and harmonic content, but it cannot always completely compensate therefor. In order to counteract this behavior, the converter terminal voltages are transformed into qd coordinates, and their components are filtered by a first-order low-pass filter and subjected to inverse transformation into abc components again. Consequently, no amplitude and phase compensation is required. That is illustrated in the equivalent circuit diagram in FIG. 3.

An explanation is given below of network operation which involves feeding into an electrical power supply network, such as, e.g., the European interconnected grid. That may be different from feeding into an island network, as will also be described below.

Since the control emulates the properties of a synchronous machine, the converter is able to synchronize itself with the electrical power supply network, which may also be referred to simply as network. Before the converter is connected to the network, a synchronization phase takes place.

The active and reactive power setpoint values are set to zero and the control ensures that the conditions according to (11) are met. That means that the amplitude and phase angle of the virtual rotor voltages $e_{abc}$ are equal to those of the network voltages $v_{abc}$ at the point of common coupling (PCC). Consequently, the active and reactive powers in the settled state, according to equations (12) and (13), are zero at the PCC.

$$\begin{cases} E = V_g \\ \theta = \theta_g \end{cases} \quad (11)$$

$$P = \frac{V_g * E * \sin(\theta - \theta_g)}{X_s} = 0 \quad (12)$$

$$Q = \frac{V_g[E * \cos(\theta - \theta_g)]}{X_s} = 0 \quad (13)$$

Since the converter is not yet connected to the network during the synchronization phase, the currents according to equation (10) are virtual. At the end of the synchronization phase, if equation (11) is satisfied, this results in the following:

$$e_{abc} - v_{abc} = 0 \rightarrow i_{sabc} = 0 \rightarrow i_q = 0 \rightarrow T_e = 0 \quad (14)$$

When the synchronization phase is concluded, the converter can be connected to the network and $P_{set}$ and $Q_{set}$ can be set to a new setpoint value. The structure proposed for network operation is illustrated in FIG. 4.

The setpoint current $i_{sabc}$ is intended to be predefined by the method. Said setpoint current $i_{sabc}$ is 3-phase and it results from a difference voltage $U_{DV}$ present at the virtual impedance $Z_V$. In the structure diagram in FIG. 4, that is illustrated such that the difference voltage $U_{DV}$ is input into said virtual impedance.

The difference voltage $U_{DV}$ results as a difference from the measured voltage $V_{PCC}$ subtracted from the virtual generator voltage $E_{gen}$. An output summing element 10 is provided for this purpose. The voltage $V_{PCC}$ is the voltage measured at the network connection point, which voltage is filtered, however, namely preferably in the manner as will also be explained with reference to FIG. 7.

The generator voltage $E_{gen}$ is calculated in the calculation model 12 and output by the latter. For this purpose, the calculation model 12 uses machine equations of the synchronous generator that have been described above. The difference between the generator voltage $E_{gen}$ and the measured voltage $V_{PCC}$ at the network connection point thus acts on the virtual impedance $Z_V$, from which the setpoint current $i_{sabc}$ is calculated. That basically means that an impedance represented by the virtual impedance Zv is present between the generator voltage and the voltage at the network connection point.

The calculation model 12 has the virtual angle of rotation $\delta$ of the rotor and a virtual rotational speed $\omega$ of the rotor as input variables. These two variables, which in this respect concern or are mechanical variables, are ultimately dependent on an active power, in particular a predefined active power.

Generating the setpoint current $L_{sabc}$ as a function of the virtual impedance $Z_V$ and the difference voltage $U_{DV}$ is based on equation (10) explained above. In this respect, the generator voltage $E_{gen}$ corresponds to the generator voltage $e_{abc}$ in equation (10) and the measured and filtered voltage $V_{PCC}$ corresponds to the voltage $v_{abc}$ in equation (10). The virtual impedance $Z_V$ corresponds to the impedance $Z_S$ in equation (10).

Moreover, the virtual excitation voltage $U_e$ and the output current $I_{abc}$ enter into the calculation model 12. The output current $I_{abc}$ can be a measured current, namely in particular the 3-phase output current that was generated by the inverter in accordance with the setpoint current $I_{sabc}$.

Figure 5:
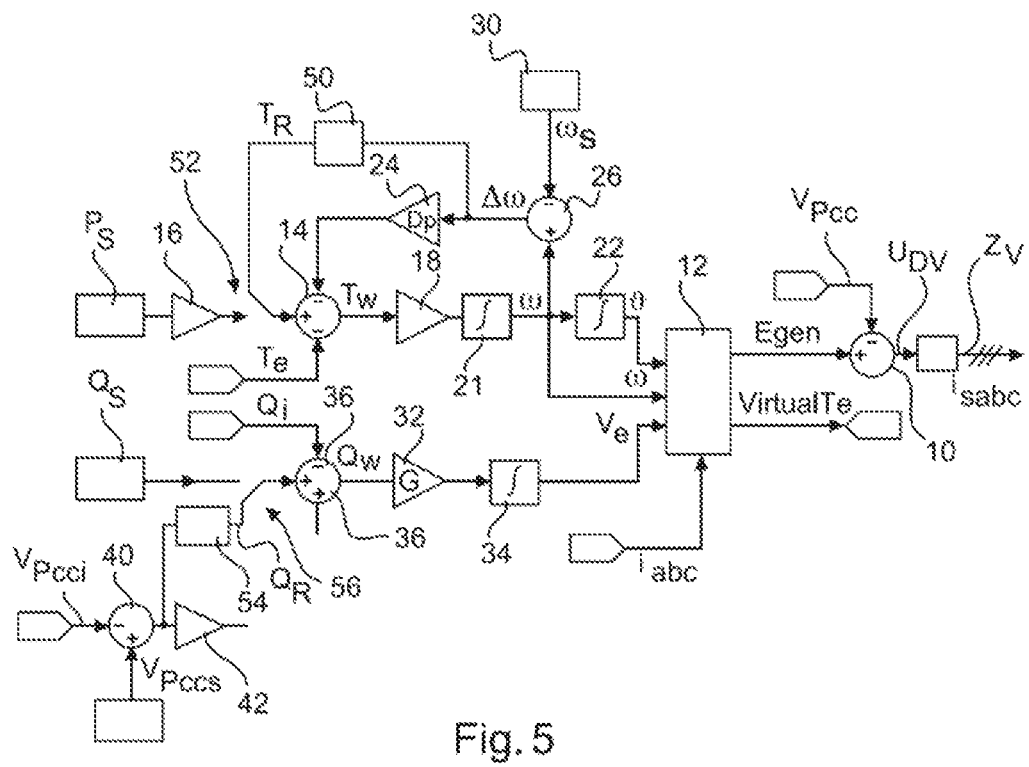
FIG. 5 shows a structure diagram of a method in accordance with one embodiment in the case of island network operation.

It is pointed out moreover that FIG. 4 and FIG. 5 contain a virtual machine model and any variables which relate to a synchronous machine therein are thus variables of this virtual synchronous machine and should thus generally be regarded as virtual variables, even if this is not specifically explained.

Moreover, the calculation model 12 outputs a virtual electrical torque $T_e$. During operation, this virtual electrical torque $T_e$ counteracts a mechanical torque $T_m$ at the torque summing element 14. An effective torque $T_w$ results from the torque summing element 14. The mechanical torque $T_m$ results from a power, which can be predefined here as setpoint power $P_s$. By way of the torque conversion 16, which substantially takes account of the rotational speed, the mechanical torque $T_m$ results from the setpoint power $P_s$ that is input.

The effective torque $T_w$ is divided by the virtual moment of inertia J, which is realized by the inertia gain 18, and then leads to the rotational speed $\omega$ by way of the first mechanical integrator 21. The rotational speed $\omega$ leads to the angle of rotation $\delta$ of the rotor by way of the second mechanical integrator 22. These two mechanical integrators 21 and 22 thus substantially form again the mechanical behavior of the rotor on which the effective torque $T_w$ acts.

In addition, a torque controller having a torque controller gain 24 is also provided. The torque controller gain 24 leads to an auxiliary torque $T_h$, which is taken into account with negative signs in the torque summing element 14 and in this respect reduces the effective torque $T_w$ as long as the auxiliary torque itself has a positive value.

For this purpose, the result of the rotational speed summing element 26 acts on the torque controller gain 24. In the rotational speed summing element, in accordance with the configuration shown in FIG. 4, a filtered rotational speed $\omega^*$ is subtracted from the virtual rotational speed $\omega$. The result is the difference rotational speed $\Delta\omega$.

With this torque control, the rotational speed $\omega$ can be influenced in particular for a synchronization. As long as the rotational speed $\omega$ changes, a difference between the rotational speed $\omega$ and the filtered rotational speed $\omega^*$ can result. For this purpose, provision is made, in particular, for the rotational speed filter 28 to have a gain of 1 and thus for the filtered rotational speed $\omega^*$ to correspond to the rotational speed $\omega$ in the steady state. In said steady state, the difference rotational speed $\Delta\omega$ 0 will then also be 0 and the auxiliary torque $T_h$ will thus also be 0. If, in the synchronization, the predefined power $P_s$ is then also 0 and the virtual electrical machine overall runs in such steady-state open-circuit operation, the virtual electrical torque $T_e$, then also becomes 0 and thus the effective torque $T_w$ then also becomes 0. The rotational speed $\omega$ then no longer changes. A synchronization is then concluded and, e.g., a connection can then be effected for feeding into the electrical power supply network via the network connection point.

For island network operation, in particular, a frequency predefinition can be effected by way of the frequency predefinition block 30, which is provided for island network operation, in particular. Island network operation will also be described below in association with FIG. 5.

The virtual excitation voltage $U_e$ results from the integration of an effective reactive power $Q_w$ taking account of a reactive power gain G, which may also be referred to as integration time constant. The reactive power gain block 32 and the reactive power integrator 34 are provided for this purpose.

The effective reactive power $Q_w$ is the result of the difference between predefined reactive power $Q_s$ and measured reactive power $Q_i$. The difference is formed at the reactive power summing element 36. The measured reactive power $Q_i$ is the reactive power fed in at that moment by the inverter. The virtual excitation voltage $U_e$ is thus set or influenced by way of the reactive power.

A voltage control can be activated or switched on by way of a voltage control switch 38. A control to a predefined voltage $V_{PCCS}$ can be performed by said voltage control. At the very least a voltage control can be performed as a function thereof. For this purpose, at the network connection point a voltage $V_{PCCI}$ measured there is subtracted from said setpoint voltage $V_{PCCS}$. The voltage summing element 40 is provided for this purpose. For the voltage control, the difference voltage $\Delta V$ thus obtained is passed by way of a voltage gain $D_q$ in the voltage gain block 42. This results in a control reactive power $Q_R$, which influences the effective reactive power $Q_w$ by way of the reactive power summing element 36 and thus the virtual excitation voltage $U_e$ is then influenced by way of the reactive power gain block 32 and the reactive power integrator 34. This control can be activated by closing the voltage control switch 38. Preferably, the voltage gain $D_q$ of the voltage gain block 42 is also variable in order to influence in particular the dynamic range of this voltage control.

During island network operation, the frequency and the voltage of the network are corrected to desired setpoint values. The frequency control is still based on equation (3) with the difference that $T_m$ is determined by a PI controller, which reacts to a frequency deviation, and is designated as $T_R$ in FIG. 5. In a similar manner to the frequency control, the voltage control is also effected by means of a PI controller, from the output of which the reactive power setpoint value results.

The corresponding control enables the converter to have a black start capability. The property is achieved by a small resistive or inductive load being connected in parallel with the converter terminals if the open-circuit currents flowing through the network filter of the converter or open-circuit currents of other operating equipment are too low for satisfactory use of a hysteresis current controller. A minimum converter output current can thus form, such that the functionality of the hysteresis control is ensured. This results in a voltage at the connecting terminals of the converter, the frequency and amplitude of which are corrected to the desired setpoint values.

Island network operation is illustrated in FIG. 5, which shows a structure like that in FIG. 4. In so far as the structure or the elements in both figures is/are identical or has/have the same function, identical designations and reference signs are used. For explanation of the functions which have not changed for island network operation, reference is also made in this respect to the explanation concerning FIG. 4.

In island network operation, then, an additional PI power controller portion 50 is provided for a power control, which basically concerns the mechanical movement of the rotor. Proceeding from a difference rotational speed $\Delta\omega$, said portion generates a controller torque $T_R$, which influences the effective torque $T_w$ by way of the torque summing element 14.

In this case, the difference rotational speed $\Delta\omega$ results as the difference between the rotational speed $\omega$ of the machine model and a setpoint rotational speed $\omega_s$, which is predefined by the frequency predefinition block 30. The frequency predefinition block 30 predefines the frequency for the island network and predefines here in this respect a setpoint frequency, converted into a setpoint rotational speed $\omega_s$. The difference is formed in the rotational speed summing element 26. A filtered rotational speed $\omega^*$ in accordance with the structure in FIG. 4 is not used here. However, the structure in accordance with FIG. 4 can also be used in so far as, for island operation, switching from the rotational speed filter 28 to the frequency predefinition block 30 is effected, as is indicated by the frequency changeover switch 29 in FIG. 4. As a result, a temporary island network situation can also be taken into account, i.e., if not just a use in an island network is implemented in principle, such as, e.g., on an actual small geographic island, rather if, on account of switching acts in a larger power supply network, a partial area of this power supply network develops into an island network, that is to say is temporarily decoupled.

By way of switching on the control torque $T_R$, the rotor movement or virtual rotor movement of the virtual synchronous machine can thus be controlled such that the predefined frequency or the predefined setpoint rotational speed $\omega_s$ is established. Taking account of a setpoint power $P_s$ by way of the torque conversion 16 is initially not provided here. It can be selected, if appropriate, by way of the setpoint power switch 52. However, the virtual electrical torque $T_e$ still acts on the effective torque $T_w$ by way of the torque summing element 14. Specifically, in this respect the machine model has remained unchanged, but a different control has been implemented. For the voltage control, island network operation in accordance with the structure in FIG. 5 likewise provides for using a PI portion, namely in the form of PI voltage control portion 54. The PI voltage control portion 54 outputs a control reactive power $Q_R$, which here is given the same designation as in FIG. 4 for the sake of simplicity. However, the control reactive power $Q_R$ is now the output of the PI voltage control portion 54. Said control reactive power $Q_c$ thus contains an integral portion. A difference between the predefined voltage $V_{PCCS}$ at the network connection point and a voltage $V_{PCCI}$ measured there once again forms the input of said PI voltage portion 54. The effective reactive power $Q_W$ is now the result of the difference between the control reactive power $Q_R$ and the measured reactive power $Q_i$. A predefined reactive power $Q_S$ is not effective because the reactive power switch 56 effects switching to the output of the PI voltage control portion 54.

What is achieved, then, by way of the PI voltage control portion 44 is that this substantially results in a reactive power being predefined which is dependent on the voltage deviation between predefined voltage and measured voltage at the network connection point. The integral portion of the PI voltage portion 54 is provided for achieving a steady-state accuracy of the predefined voltage at the network connection point.

For switching from black start operation to load operation, that is to say in the island network, and vice versa, an adaptation of the virtual impedance is carried out. This is proposed since during operation without significant loads a relatively great low-pass filtering of the difference between the virtual rotor voltage and the measured terminal voltage would be necessary in order to ensure stability.

Figure 6:
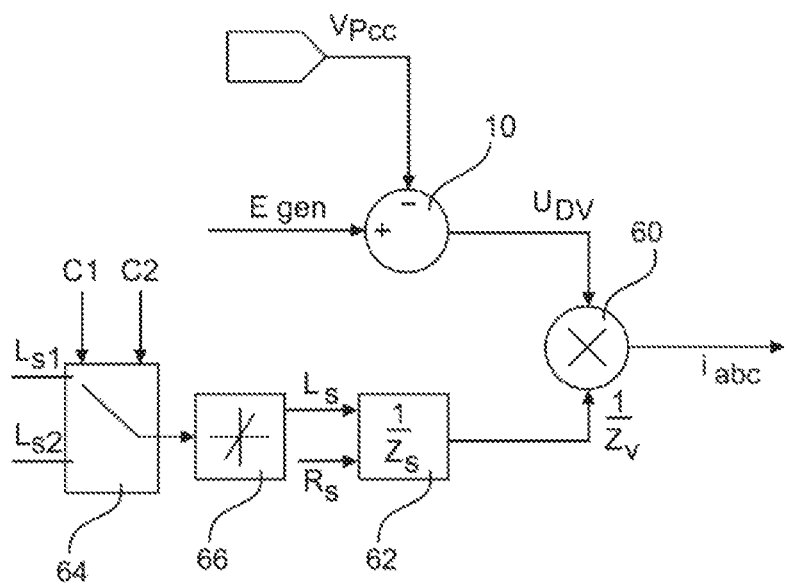
FIG. 6 shows a structure diagram for illustrating an adaptation of a virtual impedance in accordance with one embodiment.

The adaptation of the virtual impedance is illustrated in FIG. 6. The adaptation when switching from black start operation to load operation is based on the measured output power of the converter, which can concern active and/or reactive power, or alternatively on the measured power gradients dP/dt and/or dQ/dt, and is designated as condition 1, or condition C1, in FIG. 6. In this case, the inductive portion Ls of the virtual impedance Zs is altered and this alteration is limited by a maximum gradient, which can be referred to as rate limiter.

During the transition from load operation to black start operation, the load impedance becomes significantly higher. Since the setpoint value currents do not change during the transition, that leads to a significant transient increase in the terminal voltage. If the difference between the amplitudes of the virtual rotor voltage and the measured terminal voltage exceeds a specific limit, which is depicted as condition 2 or condition C2 in FIG. 6, the virtual impedance of the control is changed.

FIG. 6 shows in this respect an implementation of the virtual impedance Zv of the structures from FIGS. 4 and 5 in that the value of the inverse of said virtual impedance Zv is multiplied by the difference voltage $U_{DV}$ at the multiplier 60, thus resulting in the setpoint current $T_{abc}$. The 3-phase setpoint current $I_{abc}$ can also be referred to as setpoint currents on account of its 3-phase nature, namely one current per phase. The same applies to other 3-phase variables.

The virtual impedance Zv, which can also be referred to as Zs, is composed of an inductive part Ls and a resistive portion Rs and these variables thus form an input for the impedance block 62, in which these two portions are combined and the inverse of the impedance is formed and output for the further calculation.

In accordance with the embodiment shown, the inductive portion Ls is altered, the resistive portion Rs remaining unchanged. However, the latter, too, can be altered in principle.

The change or setting of the inductive portion Ls is then dependent, in particular, on whether black start operation or load operation is present. Accordingly, depending on these operating modes, the operating mode switch 64 can switch over between the two inductive portions, namely the inductive portion $L_{S1}$ for black start operation and $L_{S2}$ for load operation. For this purpose, the two conditions C1 and C2, respectively, are input into the operating mode switch 64. Since this switchover can be performed in the course of operation, but the virtual inductance $Z_V$ or $Z_S$, respectively, is intended not to be changed abruptly, a gradient block 66 is provided, which ensures that the change is passed on as a ramp having a maximum gradient or that the change is limited to such a slope having a maximum gradient. In this respect, such a maximum gradient is limited in terms of absolute value. In other words, both a rise and a fall are limited. In other words, if the operating mode switch 64 effects switching between two values of the inductive portions and the output of the operating switch 64 is a jump, then the output of the gradient block 66 is a ramp.

As a result, therefore, the virtual impedance $Z_V$ or $Z_S$ changes gradually and this change can thus be carried out in the course of operation and acts directly on the setpoint current $I_{abc}$ by way of the multiplier 60.

However, consideration is also given to the fact, particularly in black start operation, that not only is a switchover effected between the two inductive portions $L_{S1}$ and $L_{S2}$, respectively, but also the inductive portions effective in each case depending on the switch position of the operating mode switch 64 is altered for its part. This alteration, too, can be limited to a maximum gradient, that is to say a maximum edge steepness, by way of the gradient block 66.

Figure 7:
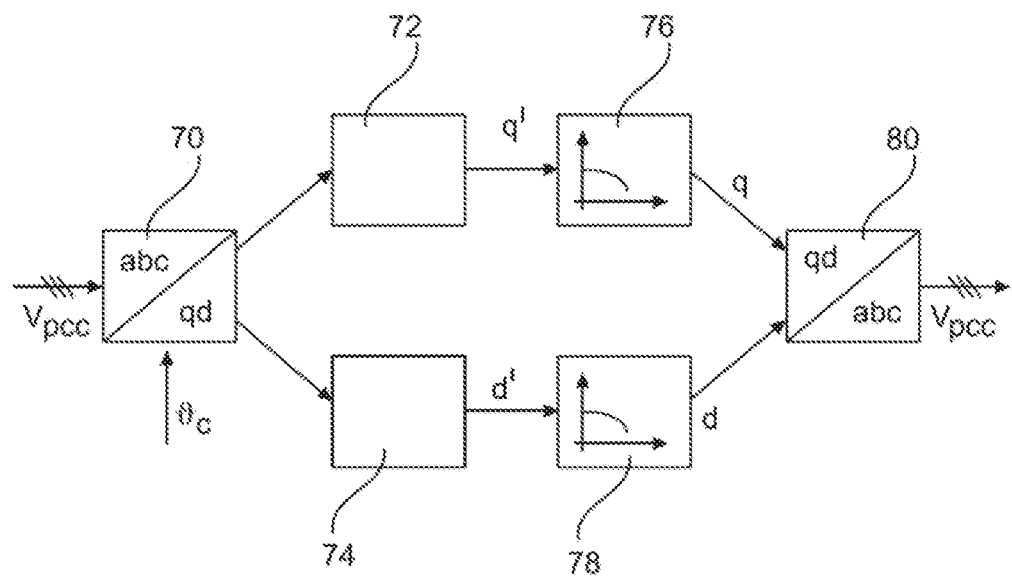
FIG. 7 shows a structure diagram for illustrating a proposed voltage filtering process in accordance with one embodiment.

FIG. 7 then illustrates the filtering of the voltage $V_{PCC}$ measured at the network connection point. The measured voltage is designated here as $V_{PCC}'$, whereas the filtered result is then the voltage $V_{PCC}$. The measured voltage $V'_{PCC}$ is input into the transformation block 70, which transforms this 3-phase voltage into a fundamentally known representation having a q component and a d component. The transformation is also known as d/q transformation and concerns the same transformation which, e.g., is also known as Park transformation. It converts the 3-phase variables, here namely the voltage of the three phases, into a two-axis coordinate system having the axes d and q. For illustration purposes, a q block 72 comprises the q component and a d block 74 comprises the d component. In order to clarify that these two components still belong to the unfiltered voltage signal $V'_{PCC}$, they are likewise illustrated as variables including a prime symbol, namely as q' and d'. They then respectively enter a filter block, namely the q filter block 76 and the d filter block 78. Both filter blocks 76 and 78 can be identical, but also different. The structure proposed in FIG. 7 uses in each case two identically parameterized first-order linear filters, that is to say in each case a PT1 element or PT1 filter. Both components q' and d' are thus passed via a first-order low-pass filter and the result is then respectively the filtered component q and d. These filtered components q and d are then passed to the inverse-transformation block 80 and subjected to inverse transformation into the 3-phase system. The result is the filtered 3-phase voltage $V_{PCC}$, which in particular in FIGS. 4 and 5 are passed to the output summation element 10.

Figure 8:
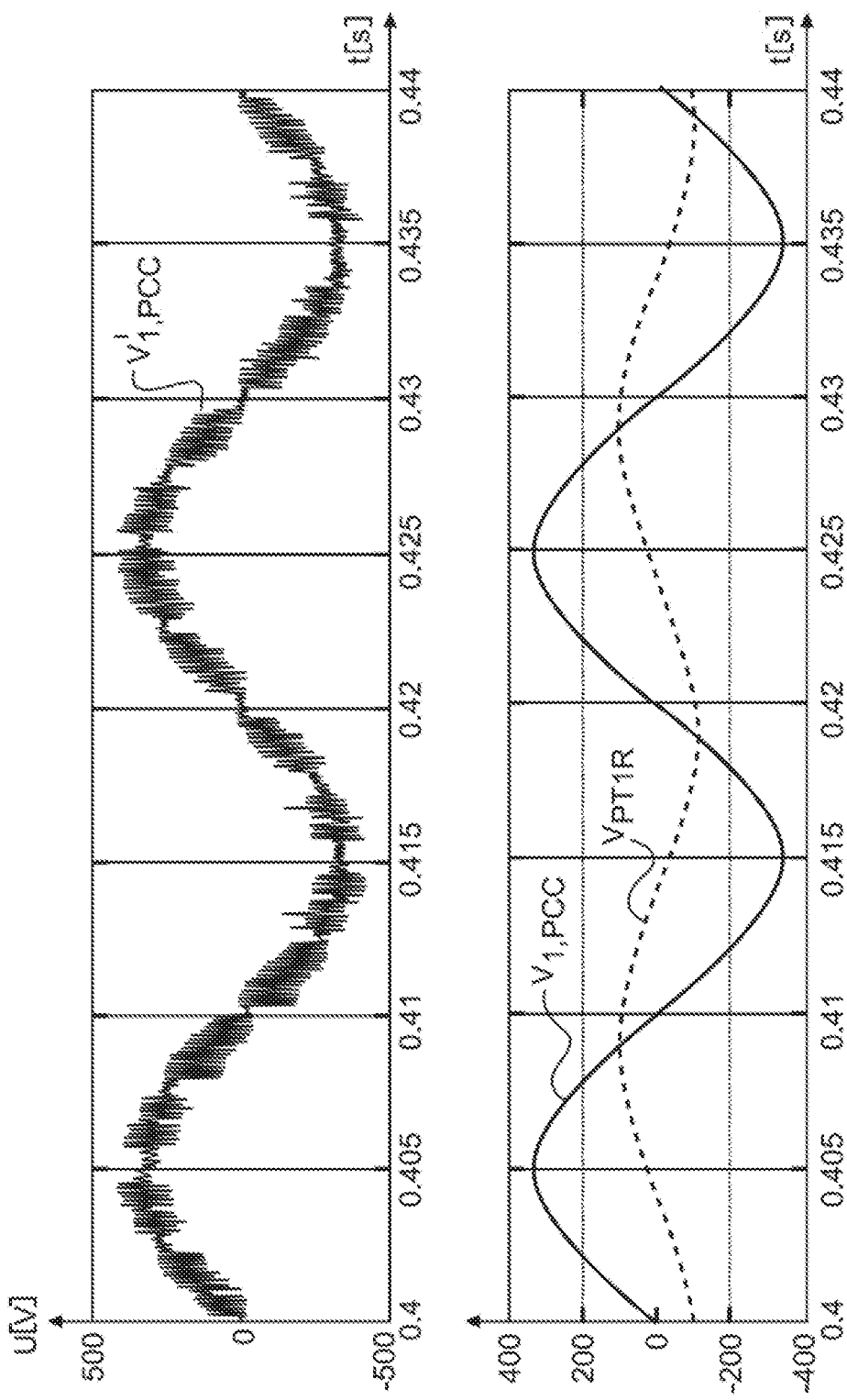
FIG. 8 shows voltage profiles for elucidating a filter effect.

FIG. 8 shows two voltage diagrams, each showing a voltage amplitude U in volts against time in seconds. The illustrated voltages thus substantially show in each case a voltage having a sinusoidal profile having a period duration of 20 ms and thus a voltage of a 50 Hz signal.

The upper illustration in FIG. 8 illustrates the voltage $V'_{1,PCC}$ of a phase that was recorded at the network connection point. That therefore corresponds to a phase of the 3-phase voltage $V'_{PCC}$ at the input of the transformation block 70 in FIG. 7. It should be noted that the results in FIG. 8 are simulation results. It is also pointed out that an electrical voltage is represented using in some instances the letter U and in some instances the letter V, without this being intended to represent any technical difference.

The upper diagram in FIG. 8 thus shows an unfiltered voltage, which is also evidently severely noisy.

The lower diagram in FIG. 8, the time axis of which diagram is identical to that of the upper diagram, illustrates two filtered voltages. The voltage $V_{1,PCC}$ shows the filtered profile with respect to the unfiltered voltage $V'_{1,PCC}$ of the upper diagram, which profile results from the filtering in accordance with FIG. 7. The voltage $V_{1,PCC}$ is thus the phase—corresponding to the upper diagram in FIG. 8—of the 3-phase voltage signal $V_{PCC}$ at the output of the inverse-transformation block 80 in FIG. 7. In other words, if a 3-phase voltage signal is input into the transformation block 70 in FIG. 7, with all three phases having approximately a profile as shown in the upper diagram in FIG. 8, a 3-phase voltage signal results at the output of the inverse-transformation block 80 in FIG. 7, all three phases of which voltage signal have approximately the profile $V_{1,PCC}$ in accordance with the lower illustration in FIG. 8. In this case, the unfiltered voltage $V'_{1,PCC}$ and the filtered voltage $V_{1,PCC}$ relate to the same phase.

It is evident that practically no phase shift occurs between the unfiltered voltage $V'_{1,PCC}$ and the corresponding filtered voltage $V_{1,PCC}$.

For the filtering, a PT1 element having the same gain, namely 1, and the same time constant, namely 10 milliseconds, was used in each case for the two filter blocks 76 and 78 in accordance with FIG. 7.

As comparison, the same noisy signal $V'_{1,PCC}$ from the upper illustration was filtered directly via a PT1 filter which was parameterized in exactly the same way as the two filter blocks 76 and 78. The result of this direct filtering by means of a PT1 filter is illustrated in a dashed manner in the lower diagram and designated as $V_{PT1R}$. Besides the reduced amplitude, which could certainly be adapted by adapting the gain of the PT1 filter, a phase shift of almost 90 degrees is also clearly discernible. That actually also reflects the phase behavior known from a PT1 filter.

It is thus evident that the proposed filtering, which not only is adapted to the 3-phase signal in a targeted manner but also in particular takes account of the fact that a sinusoidal signal is expected, yields a very good filter result. In particular, the phase fidelity should be emphasized. With the PT1 filter used internally here, a direct filtering with similar filter quality, i.e., similar noise suppression, would be possible only with a large phase shift or extensive phase lagging. Alternatively, a significantly more complex filter of higher order, in particular, could be used to reduce in particular the problem of the phase delay. However, this filter would then have to be configured with much greater complexity, and be adapted very accurately to the expected noise behavior, and would then probably not be very robust vis-à-vis changes in the signal to be filtered, in particular vis-à-vis superposed interference variables.

A power control of a converter in network operation, for both strong and weak networks, and a converter having black start capability in island network operation are thus proposed. A voltage and frequency control during island network operation has also been presented here.

In principle, the control method is suitable for use with various primary energy forms, thus, e.g., wind power installations, battery storage devices, flywheels and further forms. Furthermore, the self-commutated design of an installation power supply network such as, e.g., in the case of an uninterruptible power supply (UPS) is also possible.

A possibility of emulating a synchronous machine using a converter has thus been afforded. That is also based on the following insights. Synchronous machine emulation is particularly important with regard to increasing the proportion of loads controlled by power electronics and generator units which can lead to an energy supply system based on power electronics. Such a system can entail network instabilities since, e.g., in the event of network frequency changes, the moment of inertia or the stored rotational energy of conventional power plant generators is no longer present but can be emulated by means of targeted control strategies. Consequently, given suitable parameterization of the virtual synchronous machine, this has a positive effect on various phenomena related to the frequency, such as, e.g., a frequency dip after the failure of a relatively large power plant unit or an HVDC transmission line. Frequency oscillations may also be relevant.

After loss of the electrical power supply network, in particular after loss of an interconnected grid, it is possible to achieve the formation of an island network system by means of black start capability by virtue of the fact that the network voltage and frequency can be predefined by the converter.

A use of the core equations of a synchronous machine using a current-controlled converter for simple implementation of current limiting is made possible.

A use of the method for network formation of an island network in the case of black start and switchover from load-free to island network operation and back is a preference.

It is also proposed that, in order to generate the sinusoidal setpoint value currents, use is made of instantaneous values of the voltages, as represented in equation (10). The measured terminal voltages of the converter are not sinusoidal and may contain many harmonics; therefore, problems might arise in the calculation of the setpoint value currents and lead to instability in an unfavorable case. The process of filtering the terminal voltages into qd components, in comparisons with the abc coordinate system, leads, in the settled state, to a better voltage quality with a small filter time constant, without having to compensate for the amplitude and phase shift.

The virtual impedance according to equation (9) is adapted adaptively depending on the operating mode, such that the control stability is ensured, at least in accordance with one embodiment.

In particular, it is also possible to achieve stable operation of a current-control converter with the following properties:
- Black start by impressing a voltage at the converter terminals without a connected load.
- Switchover to island operation with load and in the process correction of voltage and frequency to selectable setpoint values.
- Synchronization with an existing network and rapid control of active and reactive power as a function of network frequency and voltage.
- Network operation even with very small short-circuit ratios.

Reference is made, in particular, to the following literature:

[Lit1] P. C. Krause, O. Wasynczuk and S. D. Sudhoff, "Analysis of Electric Machinery and Drive Systems", 2nd Edition, New York, 2002, John Wiley & Sons.

The invention claimed is:

1. A method for feeding electrical power into a three-phase electrical power supply network at a network connection point, by a wind power installation, using an inverter, the method comprising:
   detecting an electrical network voltage at the network connection point,
   determining a virtual generator voltage using a machine model that emulates a behavior of a synchronous machine,
   determining, in the machine model, a rotational speed difference between a virtual rotational speed and a reference rotational speed,
   setting, in the machine model, the reference rotational speed to a filtered value of the virtual rotational speed or a predefined frequency, wherein a difference rotational speed is determined using a difference rotational speed gain with respect to an auxiliary torque, and wherein the auxiliary torque acts on a virtual moment of inertia of the machine model at a summing point and controls the virtual rotational speed to the reference rotational speed,
   preparing the detected network voltage for comparison with the virtual generator voltage,
   predefining a setpoint current as predefinition for an infeed current as a function of the virtual generator voltage and as a function of the preparing network voltage, and
   generating the infeed current depending on the setpoint current and feeding the infeed current at the network connection point into the electrical power supply network,
   wherein preparing the detected network voltage for comparison with the virtual generator voltage comprises transforming the detected network voltage into a space vector representation.

2. The method as claimed in claim 1, wherein transforming the detected network voltage into the space vector representation comprises a d/q transformation.

3. The method as claimed in claim 1, wherein the network voltage in the space vector representation is filtered and is subjected to inverse transformation, such that the setpoint current is predefined as a function of the virtual generator voltage and as a function of the inverse-transformed network voltage.

4. The method as claimed in claim 1, wherein the machine model takes as a basis a virtual synchronous machine having a stator and a rotor, and wherein determining the virtual generator voltage involves using at least one variable in a list comprising:
   a virtual angle of rotation of the rotor,
   the virtual rotational speed of the rotor,
   a virtual excitation voltage,
   a virtual stator current,
   the virtual moment of inertia,
   a virtual torque of the rotor, or
   a virtual friction of the rotor.

5. The method as claimed in claim 4, wherein:
   a value of the infeed current generated is used as the virtual stator current.

6. The method as claimed in claim 4, wherein the virtual moment of inertia is set as a function of a network state or a network property.

7. The method as claimed in claim 1, wherein a virtual impedance is taken into account for predefining the setpoint current, wherein the virtual impedance is taken into account as an impedance between an output of the machine model or a virtual synchronous machine and the network connection point, and wherein a magnitude of the virtual impedance is variable.

8. The method as claimed in claim 7, wherein the virtual impedance is selected depending on whether:
   infeed is effected in a normal state of the electrical power supply network, or
   infeed is effected in a recovery mode after interruption or failure of the electrical power supply network, wherein in the recovery mode, the electrical power supply network is run up to a normal operating point.

9. The method as claimed in claim 1, wherein for synchronizing the machine model with the electrical power supply network,
   a setpoint power has a value zero, and
   a calculation model is used for calculating at least one of:
      internal virtual generator voltages, or
      a virtual torque, wherein the calculation model uses at least one of:
         a virtual angle of rotation of a rotor,
         the virtual rotational speed,
         a virtual excitation voltage, or
         the infeed current or the setpoint current, wherein no frequency of the electrical power supply network is detected.

10. The method as claimed in claim 1, further comprising:
    determining a virtual excitation voltage, wherein the virtual excitation voltage is a function of at least one of:
       a predefined reactive power, or
       a predefined electrical network voltage at the network connection point.

11. The method as claimed in claim 1, wherein electrical variables of the machine model are calculated in space vector representation in accordance with a d/q transformation.

12. The method as claimed in claim 1, wherein the infeed current is generated by a tolerance band method.

13. The method as claimed in claim 1, wherein in island network operation, if the inverter predefines a network frequency,
    the virtual rotational speed is dependent on a predefined network frequency such that the auxiliary torque acting in the machine model is controlled as a function of a difference between the virtual rotational speed and the predefined network frequency, and a virtual excitation voltage is dependent on a predefined voltage of the electrical power supply network and a detected voltage of the electrical power supply network such that an auxiliary reactive power value is controlled as a function of a difference between the predefined voltage and the detected voltage, the virtual excitation voltage being dependent on the auxiliary reactive power value.

14. The method as claimed in claim 13, wherein in the island network operation:

the auxiliary torque is controlled by way of a PI controller, and the virtual rotational speed results from an integration of a difference torque, which is a difference between the auxiliary torque and a virtual electrical torque, by way of an integration time constant, the auxiliary reactive power value is controlled by way of the PI controller, and the virtual excitation voltage results from an integration of a difference reactive power, which is a difference between the auxiliary reactive power and a detected reactive power, by way of an integration time constant.

15. A wind power installation comprising a controller configured to carry out the method as claimed in claim 1.

16. A wind farm comprising:

a plurality of wind power installations, and a farm inverter coupled to the network connection point and configured to carry out the method as claimed in claim 1.

17. The method as claimed in claim 1, wherein the difference rotational speed is set to zero for synchronizing the machine model with the electrical power supply network.

18. A wind power installation for feeding electrical power into a three-phase electrical power supply network at a network connection point, the wind power installation comprising:

an inverter for generating an infeed current, a voltmeter for detecting an electrical network voltage at the network connection point, and a controller for controlling feeding electric power into the electrical power supply network at the network connection point, wherein the controller is configured to:

determine a virtual generator voltage using a machine model that emulates a behavior of a synchronous machine, prepare the detected network voltage for comparison with the virtual generator voltage, and define a setpoint current as predefinition for the infeed current as a function of the virtual generator voltage and as a function of the network voltage, wherein the inverter is configured to generate the infeed current depending on the setpoint current and to feed the infeed current at the network connection point into the electrical power supply network, wherein determining the detected network voltage for comparison with the virtual generator voltage includes transforming the detected network voltage into a space vector representation, wherein in the machine model, a rotational speed difference is determined between a virtual rotational speed and a reference rotational speed, and the reference rotational speed is set to a filtered value of the virtual rotational speed or a predefined frequency, wherein a difference rotational speed is determined using a difference rotational speed gain with respect to an auxiliary torque, and wherein the auxiliary torque acts on a virtual moment of inertia of the machine model at a summing point and controls the virtual rotational speed to the reference rotational speed.

* * * * *